June 12, 1951  S. O. JAKOBSEN  2,556,968
APPARATUS FOR DISTRIBUTION OF LUBRICANT
Filed Dec. 29, 1947
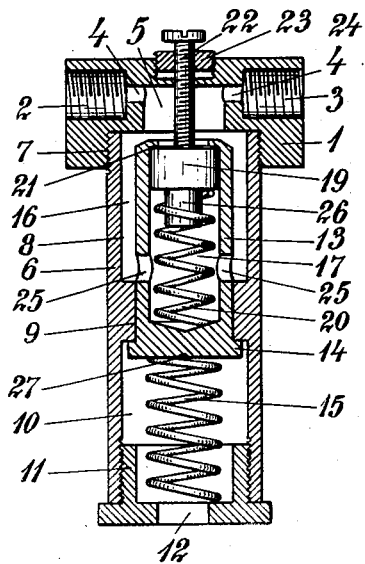
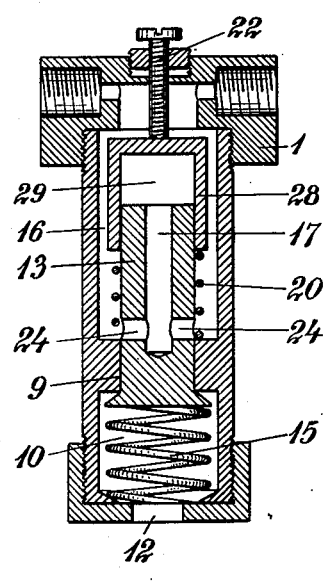
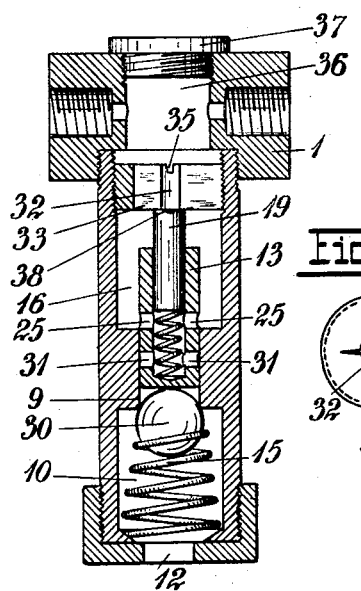
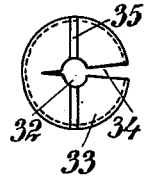
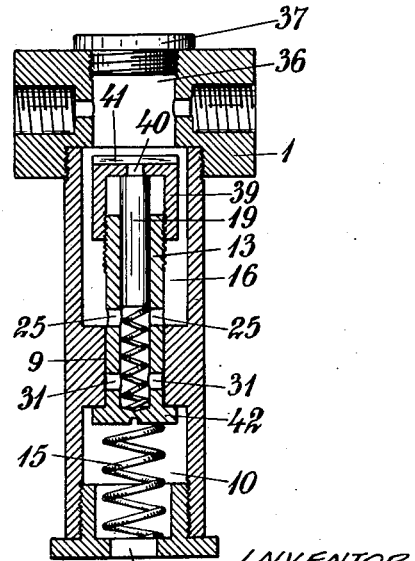
INVENTOR
Svend Oder Jacobsen
BY Patented June 12, 1951

2,556,968

UNITED STATES PATENT OFFICE 2,556,968

APPARATUS FOR DISTRIBUTION OF LUBRICANTS

Svend Older Jakobsen, Haugesund, Norway

Application December 29, 1947, Serial No. 794,401
In Norway December 24, 1943

Section 1, Public Law 690, August 8, 1946
Patent expires December 24, 1963

17 Claims. (Cl. 184—7)

The present invention relates to an apparatus for the distribution of lubricant, where a pressure pump is used common to a plurality of lubrication points, said pressure pump, through a pipe line provided with branches, forcing the lubricant along to the lubrication points. The apparatus is intended to be connected to the common pipe line at the points of branching and serves for measuring and distributing definite lubricant quantities to the lubrication points at each pressure stroke of the pump.

It is an object of the invention to provide an apparatus, which, with a high degree of accuracy, measures and distributes definite quantities of lubricants independently of the consistency of the lubricant or the back pressure arising from the points to be lubricated. It is a further object of the invention to make it possible that an eventual leakage arising in the apparatus will result in a greater supply of lubricant to those lubrication points offering the greatest back-pressure, as any leakage arising around the piston of the apparatus will be added to the quantity of lubricant measured out for the purpose.

The present invention consists in an apparatus for delivering measured quantities of lubricants from a supply line to a device to be lubricated, comprising in combination, a hollow casing having a reduced mid-portion and two chambers having substantially equal cross-sections and being separated from each other by the mid-portion, the first of the chambers being adapted to be connected to a line supplying the lubricant and the second of the chambers being adapted to be connected to the device to be lubricated, a hollow piston slidably fitting into the mid-portion and having an open end located in the first chamber and a closed end facing the second chamber, means arranged in the wall of the hollow piston for alternately establishing a connection of the hollow of the piston with the first chamber and the second chamber, respectively, a second piston arranged for sliding motion with respect to the hollow piston, resilient means arranged in the second chamber and abutting against the closed end of the hollow piston, resilient means arranged to urge the second piston away from the hollow piston, and adjustable means for limiting the motion of the second piston away from the hollow piston.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional elevation of a first embodiment of the present invention;

Fig. 2 is a sectional elevation of a second embodiment of the present invention;

Fig. 3 is a sectional elevation of a third embodiment of the present invention;

Fig. 4 shows a detail of Fig. 3 in plan view; and

Fig. 5 is a sectional elevation of a fourth embodiment of the present invention.

Referring now to the drawings, and first to Figure 1 a three way tube-coupling is indicated by 1, which by means of the threaded borings 2 and 3 is connected with a pipe or supply line from the lubricant pump, and to which the lubricant distributor is secured. If the distributor in question is provided at the end of a pipe line, one of the borings has to be plugged. The tube-coupling is provided with a longitudinally extending channel 4, interconnecting the borings 2 and 3, as well as with a transversal channel 5, which is connected with the channel 4 and also with the distributor, the casing 6 of which, by means of the thread 7, is attached to the tube-coupling.

The end of the casing 6 facing the tube-coupling has a cylindrical boring or chamber 8, the inner end of which communicates with a somewhat narrower cylindrical boring or reduced mid-portion 9 provided in the central portion of the casing. Said reduced mid-portion is in communication with a cylindrical boring or chamber 10 provided in the opposite end of the casing, said latter boring having substantially a diameter equal to that of the boring 8. Into the outer end of the boring 10 is screwed a tube-nipple 11, the opening 12 of which is to be connected to the lubrication point.

Inside the casing 6 is provided a first hollow piston 13 having a diameter equal to that of the boring or reduced mid-portion 9, so that it moves in the same with a tight fit. The piston has such a length that in the top position thereof, as shown, it reaches almost to the very top end of the casing. A further movement upwardly is prevented by a shoulder 14 provided at the lower end of the piston 13 and abutting against the lower limiting edge of the boring 9. Normally the piston 13 is kept in its upper end position by means of a pressure spring 15 arranged in the boring 10 between the lower face of the piston and the nipple 11. The piston 13 is stopped in its bottom end position by abutting against the upper edge of the nipple 11. When the piston 13 is in its upper end position, an annular channel 16 is formed between the piston and the wall of the boring 8 and communicates through the channels 4 and 5 of the tube-coupling with the supply pipe line for the lubricant.

The piston 13 is provided with a cylindrical boring 17 with an upper opening 18. In the boring 17 is provided a second piston 19, which, normally, is kept in its top position by a pressure spring 20 provided in the boring 17. The piston 19 is stopped in this position by an inwardly extending flange 21 provided at the upper end of the piston 13. In order to adjust the top-position of the piston 19, an adjustment screw 22 is provided in the tube-coupling, the lower end of said screw forming a stop for the piston 19.

In the wall of the piston 13 are provided transversal channels 25, which, when the piston 13 is in its top position, are immediately above the boring 9 of the casing 6 and thus interconnect the channel 16 with the boring 17 of the piston 13. On its bottom side the piston 19 may be provided with an abutment 26, abutting against the bottom of the boring 17, if the piston 19 is not stopped before it reaches this position in its downward movement owing to the pressure developed in the spring 20 or owing to lubricant located below the piston 19.

The operation of this device is as follows: Before the start of the pressure stroke of the pump, the pistons 13 and 19 are in their top-positions as shown in Fig. 1. During the pressure stroke lubricant is forced through the channels 4, 5 and 16, filling, through the channels 25, the boring 17 of the piston 13. When the filling has been completed, the piston 13, on account of the pressure being exerted on its top face, is pressed downwardly, so that the channels 25 are closed by coming into contact with the wall of the boring 9 and a certain quantity of lubricant is shut up in the piston 13, part of which lubricant is to be conducted to the lubrication point. The piston 13 continues its downward movement until the channels 25 communicate with the boring 10. Thereby the pressure in the piston 13 is relieved, and the piston 19, on account of the pressure exerted on its upper face, is driven downwardly against the tension of the spring 20. During this movement the piston 19 will force a certain part of the lubricant in the boring 17 through the boring 10 and the opening 12 to the lubrication point. The amount of this part of the lubricant will be dependent on the position of the screw 22 as well as on the bottom position of the piston 19, which is reached, provided that the spring 20 is not too strong, in the moment when the piston 19 barely has shut off the channels 25. The lower surface of the piston 13 is provided with one or more transversal grooves 27 in order to allow the lubricant to pass if the piston is forced down so far as to abut against the nipple 11.

When the predetermined amount of lubricant has been pressed out of the boring 17, the pump pressure is relieved, if desired by hand, whereupon the pistons 13 and 19 are returned into their starting positions by the springs 15 and 20, respectively. The tension of the spring 15 is greater than that of the spring 20 in order to secure that the piston 19, when the pressure is relieved, starts its upward movement before movement in the boring 17 of the piston 13, thus preventing lubricant from being sucked from the boring 10 back into the piston 13.

During the operation of the apparatus the pipe lines leading to and from the same, the boring 10 and the channels 4, 5 and 16 are constantly filled with lubricant, which is forced to move backwards and forwards in phase with the piston-strokes of the pressure pump. The amount of lubricant delivered at each pressure stroke of the pump to the lubrication point, that is to say the amount of lubricant corresponding to the stroke volume of the piston 19, has no chance of flowing in the opposite direction during the suction-stroke, directed upward and remains in the place to be lubricated. The lubricant, therefore, performs an intermittent progressive movement in the direction of the lubrication point in phase with the pressure stroke of the pressure-piston in superposition to a reciprocating movement of the lubricant.

By means of the distributor described hereinabove the lubricant is forced out rather slowly, and, though the distributor has tight-fitting cylindrical valves, the wide channels 25 give free passage to even coarse impurities in the lubricant, which, therefore, cannot stop the supply of lubricant. As no overflow and no leakage takes place between the filling and feeding operations, the springs 15 and 20 may have a large inherent power, whereby accuracy of distribution and feeding of every distributor is obtained.

The embodiment shown in Figure 2 corresponds substantially to the one described above. The only exception is that the piston 19 is replaced by a displaceable, sleeve-shaped piston 28 embracing the piston 13, said sleeve-shaped piston 28 being actuated by the spring 20, whereas the hollow space 29 inside the sleeve-shaped piston 28 as well as the boring 17 contain the amount of lubricant to be carried to the lubrication point. The operation of this device is substantially the same as that of the device described above.

A further embodiment is shown in Figure 3 according to which the outward shape of the hollow piston 13 is cylindrical throughout its entire length without any shoulder being provided at its lower end. The piston 13 may therefore be ground in a very simple manner and with the greatest accuracy, which is of great importance. During the filling operation the piston is kept under a pressure directed upwardly by means of a ball 30 actuated by the spring 15. The diameter of said ball is larger than that of the boring 9, so that said ball, during the filling operation, abuts with a tight fit against the lower edge of the boring 9. The inner piston 19 has a cylindrical shape throughout its entire length.

The wall of piston 13 is provided with an additional set of channels 31, arranged in such a way that the channels 25, during the downward movement of the piston, are blocked before the channels 31 get into communication with the boring 10. Thus a considerable shortening of the stroke of the piston between the filling and the feeding-positions is accomplished compared to an apparatus where only one set of channels is used.

Instead of the adjustment screw 22 used for the control of the top position of the piston 19, an adjustment nut 33 having an axial hole 32 is provided, said adjustment nut being adjustably screwed into the upper portion of the casing 6 and against which the upper end of the piston 19 abuts when in filling position. The nut 33 a plan view of which is shown in Figure 4, is partly slitted transversely by means of a slit 34. When the nut is to be inserted into the casing, the sides of the nut 33 are pressed toward each other the nut being made of a resilient material. Owing to this friction is exerted sufficient for securing the nut in position. The adjustment of the nut is effected by means of a screw-driver brought into engagement with a transversal groove 35 provided in the nut. The screw-driver may be inserted through an opening 36 provided in the tube-coupling 1, said opening being kept closed by means of a screw-plug 37. If such an opening should not be desirable, it will be necessary to dismount the casing 6 in order to make the adjustment. In order to facilitate the flow of the lubricant from the hole 32 in the nut to the channel 16, when the piston 19 is in its top position, the upper end of the piston may be provided with radial grooves 38.

In the construction shown in Figure 5 the adjustment nut 33 according to Figure 3, is given the shape of a cap-nut 39, screwed onto the upper end of the piston 13. The cap nut is provided with a central hole 40 permitting pressure exerted by the lubricant to actuate the upper end of the piston 19, said cap nut having also a groove 41 suitable for engagement by a screw-driver. In that case the lower end of the piston 13 must be provided with a shoulder 42.

The constructional details of course may be different from those shown and described without departing from the scope of the invention.

What I claim is:

1. An apparatus for delivering measured quantities of a lubricant from a supply line to a device to be lubricated, comprising in combination, a hollow casing having a reduced mid-portion and two chambers having substantially equal cross-sections and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; means arranged in the wall of said hollow piston for alternately establishing a connection of the hollow of said piston with said first chamber and said second chamber, respectively; a second piston arranged for sliding motion with respect to said hollow piston; resilient means arranged in said second chamber and abutting against the closed end of said hollow piston; resilient means arranged to urge said second piston away from said hollow piston; and adjustable means for limiting the motion of said second piston away from said hollow piston.

2. An apparatus for delivering measured quantities of a lubricant from a supply line to a device to be lubricated, comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; means arranged in the wall of said hollow piston for alternately establishing a connection of the hollow of said piston with said first chamber and said second chamber, respectively; a solid piston arranged for sliding motion with respect to said hollow piston; resilient means arranged in said second chamber and abutting against the closed end of said hollow piston; resilient means arranged to urge said solid piston away from said hollow piston; and adjustable means for limiting the motion of said solid piston away from said hollow piston.

3. An apparatus for delivering measured quantities of a lubricant from a supply line to a device to be lubricated comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber; and a closed end facing said second chamber; means arranged in the wall of said hollow piston for alternately establishing a connection of the hollow of said piston with said first chamber and said second chamber, respectively; a second hollow piston having an open end arranged for sliding engagement with the open end of said first mentioned hollow piston; resilient means arranged to urge said second hollow piston away from said first mentioned hollow piston resilient means arranged in said second chamber and abutting against the closed end of said first hollow piston; and adjustable means for limiting the motion of said second hollow piston away from said first mentioned hollow piston.

4. An apparatus for delivering measured quantities of a lubricant from a supply line to a device to be lubricated comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; a shoulder arranged on said closed end of said hollow piston and abutting against the lower edge of said mid-portion of said casing; means arranged in the wall of said hollow piston for alternately establishing a connection of the hollow of said piston with said first chamber and said second chamber, respectively; a second piston arranged for sliding motion with respect to said hollow piston; resilient means arranged in said second chamber and abutting against the closed end of said hollow piston; resilient means arranged to urge said second piston away from said hollow piston; and adjustable means for limiting the motion of said second piston away from said hollow piston.

5. An apparatus for delivering measured quantities of a lubricant from a supply line to a device to be lubricated, comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; a shoulder arranged on said closed end of said hollow piston and abutting against the lower edge of said mid-portion of said casing; means arranged in the wall of said hollow piston for alternately establishing a connection of the hollow of said piston with said first chamber and said second chamber, respectively; a solid piston arranged for sliding motion with respect to said hollow piston; resilient means arranged in said second chamber and abutting against the closed end of said hollow piston; resilient means arranged to urge said solid piston away from said hollow piston; and adjustable means for limiting the motion of said solid piston away from said hollow piston.

6. An apparatus for delivering measured quantities of a lubricant from a supply line to a device to be lubricated, comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; a shoulder arranged on said closed end of said hollow piston and abutting against the lower edge of said mid-portion of said casing; means arranged in the wall of said hollow piston for alternately establishing a connection of the hollow of said piston with said first chamber and said second chamber, respectively; a second hollow piston having an open end arranged for sliding engagements with the open end of said first mentioned hollow piston; resilient means arranged in said second chamber and abutting against the closed end of said first mentioned hollow piston; resilient means arranged to urge said second hollow piston away from said first mentioned hollow piston; and adjustable means for limiting the motion of said second hollow piston away from said first mentioned piston.

7. An apparatus for delivering measured quantities of a lubricant from a supply line to a device to be lubricated, comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; means arranged in the wall of said hollow piston for alternately establishing a connection of the hollow of said piston with said first chamber and said second chamber, respectively; a solid piston arranged for sliding motion with respect to said hollow piston; resilient means arranged in said second chamber and abutting against the closed end of said hollow piston; resilient means arranged to urge said solid piston away from said hollow piston; and adjustable means for limiting the motion of said solid piston away from said hollow piston.

8. An apparatus for delivering measured quantities of a lubricant from a supply line to a device to be lubricated comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; a shoulder arranged on said closed end of said hollow piston and abutting against the lower edge of said mid-portion of said casing; means arranged in the wall of said hollow piston for alternately establishing a connection of the hollow of said piston with said first chamber and said second chamber, respectively; a second piston arranged for sliding motion with respect to said hollow piston; an abutment forming part of said solid piston and arranged to abut against said closed end of said hollow piston when said solid piston is in one of its end positions with respect to said hollow piston; resilient means arranged in said second chamber and abutting against the closed end of said hollow piston; resilient means arranged to urge said second piston away from said hollow piston; and adjustable means for limiting the motion of said second piston away from said hollow piston.

9. An apparatus for delivering measured quantities of a lubricant from a supply line to a device to be lubricated, comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; means arranged in the wall of said hollow piston for alternately establishing a connection of the hollow of said piston with said first chamber and said second chamber, respectively; a second piston arranged for sliding motion with respect to said hollow piston; resilient means arranged in said second chamber and abutting against the closed end of said hollow piston; resilient means arranged to urge said second piston away from said hollow piston; and adjustable means for limiting the motion of said second piston away from said hollow piston, said adjustable means including a disc screwed into said first chamber; said disc having a central hole and a transverse slot extending over the major part of a diameter of said disc.

10. An apparatus for delivering measured quantities of a lubricant from a supply line to a device to be lubricated comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; means arranged in the wall of said hollow piston for alternately establishing a connection of the hollow of said piston with said first chamber and said second chamber, respectively; a second piston arranged for sliding motion with respect to said hollow piston; resilient means arranged in said second chamber and abutting against the closed end of said hollow piston; resilient means arranged to urge said second piston away from said hollow piston; and adjustable means for limiting the motion of said second piston away from said hollow piston, said adjustable means including a cap-nut screwed on the outside of said open end of said hollow piston and having a central hole.

11. An apparatus as claimed in claim 9; an opening in the supply line aranged in axial alignment with said first chamber; and a closing plug for said opening, the removal of which renders said disc accessible.

12. An apparatus for delivering measured quantities of lubricant from a supply line to a device to be lubricated comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said chamber; means including two sets of axially displaced channels arranged in the wall of said hollow piston for alternately establishing a connection of the hollow of said piston with said first chamber and said second chamber, respectively; a second piston arranged for sliding motion with respect to said hollow piston; resilient means arranged in said second chamber and abutting against the closed end of said hollow piston; resilient means arranged to urge said second piston away from said hollow piston; and adjustable means for limiting the motion of said second pitson away from said hollow piston.

13. An apparatus for delivering measured quantities of a lubricant from a supply line to a device to be lubricated comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; a shoulder arranged on said closed end of said hollow piston and abutting against the lower edge of said mid-portion of said casing; means including two sets of axially displaced channels arranged in the wall of said hollow piston for alternately establishing a connection of the hollow of said piston with said first chamber and said second chamber, respectively; a second piston arranged for sliding motion with respect to said hollow piston; resilient means arranged in said second chamber and abutting against the closed end of said hollow piston; resilient means arranged to urge said second piston away from said hollow piston; and adjustable means for limiting the motion of said second piston away from said hollow piston.

14. An apparatus for delivering measured quantities of lubricant from a supply line to a device to be lubricated comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said chamber; means including two sets of axially displaced channels arranged in the wall of said hollow piston for alternately establishing a connection of the hollow of said piston with said first chamber and said second chamber, respectively; a second piston arranged for sliding motion with respect to said hollow piston; resilient means arranged in said second chamber and abutting against the closed end of said hollow piston; resilient means arranged to urge said second piston away from said hollow piston; and adjustable means for limiting the motion of said second piston away from said hollow piston, said adjustable means including a disc screwed into said first chamber, said disc having a central hole and a transverse slot extending over the major part of a diameter of said disc.

15. An apparatus for delivering measured quantities of a lubricant from a supply line to a device to be lubricated, comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected in the device to be lubricated; a hollow piston slidably fitting into said mid-portion and having an open end located in said first chamber and a closed end facing said second chamber; means arranged in the wall of said hollow piston for alternately establishing a connection of the hollow of said said piston with said first chamber and said second chamber, respectively; a cylindrical solid piston arranged for sliding motion with respect to said hollow piston; resilient means arranged in said second chamber and abutting against the closed end of said hollow piston; resilient means arranged to urge said cylindrical solid piston away from said hollow piston; and adjustable means for limiting the motion of said cylindrical solid piston away from said hollow piston.

16. An apparatus for delivering measured quantities of a lubricant from a supply line to a device to be lubricated, comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; means arranged in the wall of said hollow piston for alternately establishing a connection of the hollow of said piston with said first chamber and said second chamber, respectively; a cylindrical solid piston arranged for sliding motion with respect to said hollow piston; a ball arranged in said second chamber and having a diameter slightly greater than the diameter of said mid-portion; an expansion spring arranged between said ball and the outer end of said second chamber; resilient means arranged to urge said cylindrical solid piston away from said hollow piston; and adjustable means for limiting the motion of said cylindrical solid piston away from said hollow piston.

17. An apparatus for delivering measured quantities of a lubricant from a supply line to a device to be lubricated comprising in combination, a hollow casing having a reduced mid-portion and two chambers having substantially equal cross-section and being separated from each other by said mid-portion; the first of said chambers being adapted to be connected to a line supplying the lubricant and the second of said chambers being adapted to be connected to the device to be lubricated; a hollow piston slidably fitting into said mid-portion and having an open end located in said first chamber and a closed end facing said second chamber; means arranged in the wall of said hollow piston for alternately establishing a connection of the hollow of said piston with said first chamber and said second chamber, respectively; a second piston arranged for sliding motion with respect to said hollow piston; resilient means arranged in said second chamber and abutting against the closed end of said hollow piston; resilient means arranged to urge said second piston away from said hollow piston, said last mentioned resilient means being appreciably weaker than said first mentioned resilient means; and adjustable means for limiting the motion of said second piston away from said hollow piston.

SVEND OLDER JAKOBSEN.

REFERENCES CITED

The following references are of record in the file of this patent:

UNITED STATES PATENTS

| Number | Name | Date |
|---|---|---|
| 1,942,097 | Hallerberg | Jan. 2, 1934 |